US005804109A

United States Patent [19]

Perkins

[11] Patent Number: 5,804,109

[45] Date of Patent: Sep. 8, 1998

[54] METHOD OF PRODUCING AN EAR CANAL IMPRESSION

[75] Inventor: Rodney C. Perkins, Woodside, Calif.

[73] Assignee: ReSound Corporation, Redwood City, Calif.

[21] Appl. No.: 748,488

[22] Filed: Nov. 8, 1996

[51] Int. Cl.[6] .......................... B29C 33/40; H04R 25/02; G01B 5/04

[52] U.S. Cl. ................ 264/40.1; 264/222; 264/DIG. 30; 600/25

[58] Field of Search ............................ 264/222, DIG. 30, 264/40.1; 600/25

[56] References Cited

U.S. PATENT DOCUMENTS

| | | | |
|---|---|---|---|
| 3,440,314 | 4/1969 | Frisch | 264/222 |
| 4,098,277 | 7/1978 | Mendell | 128/303 R |
| 5,201,007 | 4/1993 | Ward et al. | 381/68.6 |
| 5,440,082 | 8/1995 | Claes | 181/135 |
| 5,455,994 | 10/1995 | Termeer et al. | 29/169.5 |
| 5,531,954 | 7/1996 | Heide et al. | 264/496 |

*Primary Examiner*—Jan H. Silbaugh
*Assistant Examiner*—Suzanne E. Mason
*Attorney, Agent, or Firm*—Burns, Doane, Swecker & Mathis, LLP

[57] ABSTRACT

A method of fabricating an ear canal impression which includes the steps of (a) placing a covering on the tympanic membrane of a hearing-impaired person, (b) marking the junction between the bony and cartilaginous portions of the auditory canal, (c) introducing an ear canal impression material into the auditory canal, (d) and allowing the ear canal impression material to harden to form the ear canal impression whereby the ear canal impression includes an indentation on its surface corresponding to said marking is provided. The ear canal impression is then employed to fabricate an ear canal mold for a completely-in-canal hearing aid device. In this fashion, the hearing aid when placed in the auditory ear canal is assured to fit and rest snugly on the bony canal. This prevents the device from shifting away from the tympanic membrane and, therefore, reduces the opportunity for positive feedback and discomfort for the individual.

6 Claims, 2 Drawing Sheets

METHOD OF PRODUCING AN EAR CANAL IMPRESSION

FIELD OF THE INVENTION

The present invention provides a reliable and safe method to fabricate ear canal impressions for acoustic devices that maximizes the advantages of placing such devices near the tympanic membrane within the bony part of the external auditory canal. The invention is particularly suited for completely-in-canal acoustic devices.

BACKGROUND OF THE INVENTION

Many hearing aid systems for the hearing impaired individuals rely on acoustic transducers that produce amplified sound waves which, in turn, impart vibrations to the tympanic membrane or eardrum. These vibrations, at varying frequencies and amplitudes, result in the perception of sound by the individual wearing an acoustic device. Acoustic hearing systems are described, for example, in U.S. Pat. Nos. 5,033,090, 5,003,608, 4,962,537, 4,937,876, 4,890,330, 4,556,122, 4,471,490 and 3,865,998.

A persistent problem associated with acoustic devices is positive feedback which occurs when a portion of the acoustic output returns or feeds back to the input transducer (microphone), thus causing self-sustained oscillation, often of increasing amplitude. The potential for positive feedback generally increases with the amplification level of the system and, therefore, the output level of many acoustic devices has to be reduced to less than a desirable level to prevent a positive feedback situation. This problem, which may result in output levels inadequate to compensate for hearing losses in particularly severe cases, continues to be a major problem with acoustic type hearing aids.

Early hearing aids typically extended out of the inner ear to the auricle, that part of the external ear which is outside of the head. The extended portion of those hearing aids was visually evident, which was cosmetically and aesthetically undesirable. Electronic miniaturization has allowed in-the-ear hearing aid devices to be disposed within the ear's canal, greatly improving the sensitivity and sound quality of the devices and, importantly, also making them almost visually undetectable.

Further progress toward improving the auditory capabilities of hearing impaired individuals had included providing canal recontour medical procedures. These processes have the object of allowing hearing aid devices to be even more deeply seated and snugly fitted in the ear canal, thereby further improving sound quality. In the art, such devices are often referred to a completely-in-canal acoustic devices. In theory, if such completely-in-canal acoustic devices can be properly fitted so that they completely fill the cross-sectional area of the canal yet are comfortably located along the length of the canal, there are numerous advantages as compared to acoustic devices that are not completely located int the ear canal.

In-the-ear hearing devices typically comprise electronic components that are encased in a custom made ear shell or ear mold. A method of fabricating an ear mold is described in U.S. Pat. No. 4,834,927. The technique employs an ear impression that is made directly in the auditory canal which is filled with ear impression material. Although ear mold helps create a snug fit for the hearing device, positive feedback problems persist for many individuals.

SUMMARY OF THE INVENTION

The present invention is based, at least in part, on the discovery that positioning a completely-in-canal hearing device in the auditory canal so that the device rests entirely on the bony (i.e., non-cartilaginous) portion of the canal improves the quality of sound perceived by the individual wearing the device. It is believed that prior art techniques wherein the hearing device was fitted to partially rest on the auditory canal above the cartilaginous portion causes the device to shift during ordinary usage. This shifting causes the device to move away from the tympanic membrane resulting in positive feedback and discomfort to the individual. An important step to realizing practical value from this discovery is to create an ear canal impression which allows fabrication of a completely-in-canal acoustic hearing device that can be precisely positioned in the auditory canal so that the device rests entirely on the bony (i.e., cartilaginous) portion of the canal.

In one aspect, the present invention is directed to a method of fabricating an ear canal impression which comprises the steps of:

- placing a covering on the tympanic membrane of a hearing-impaired person;
- marking the junction between the bony and cartilaginous portions of the auditory canal;
- introducing an ear canal impression material into the auditory canal; and
- allowing the ear canal impression material to harden to form the ear canal impression whereby the ear canal impression includes an indentation on its surface corresponding to said marking.

The ear canal impression is then employed to fabricate an ear canal mold for the components of the hearing aid device. In this fashion, the hearing aid when placed in the auditory canal is assured to fit and rest snugly on the bony portion of the auditory canal.

BRIEF DESCRIPTION OF THE DRAWINGS

The present invention can be further understood by reference to the appended drawings wherein like numerals designate the same element throughout the several drawings. In the drawings.

DETAILED DESCRIPTION OF THE PREFERRED EMBODIMENTS

Figure 1:
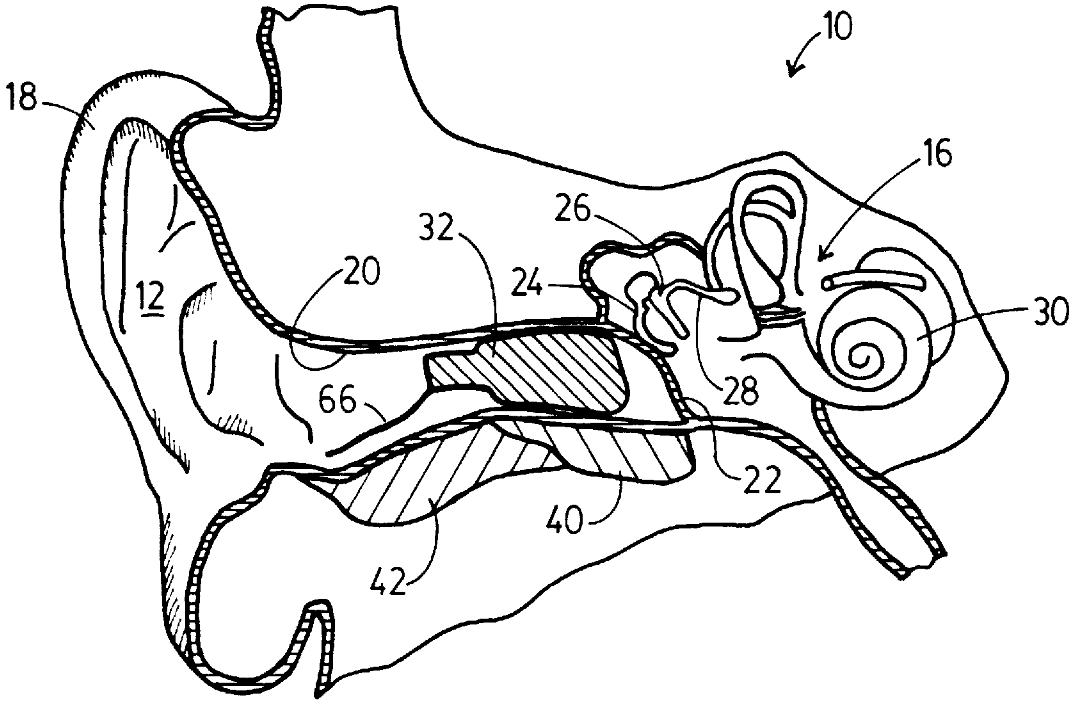
FIG. 1 is a schematic diagram showing the approximate placement of a completely-in-canal acoustic hearing device in the auditory canal.

Referring to the drawings generally, and to FIG. 1 in particular, there are shown cross sectional views of an ear, generally referred to by number 10, which has received a hearing device. The ear 10 comprises an outer ear 12, a middle ear 14, and an inner ear 16. The outer ear 12 includes an auricle or pinna 18, and an outer ear (or auditory) canal 20. The pinna 18 collects acoustic energy or sound waves from the environment and directs them into the auditory ear canal 20 which conveys the sound waves by air conduction to a tympanic membrane or ear drum 22, which separates the outer ear 12 from the middle ear 14.

The middle ear 14 contains a series of three tiny interconnected bones: the malleus (hammer) 24; the incus (anvil) 26; and the stapes (stirrup) 28. Collectively, these three bones are known as the ossicles or the ossicular chain. The malleus is attached to the tympanic membrane while the stapes, the last bone in the ossicular chain, is attached to the oval window (inner ear)(not shown).

In unimpaired hearing, sound waves that travel down the auditory canal, strike the tympanic membrane and cause it to vibrate. The malleus, being connected to the tympanic membrane, is thus also set into motion, along with the incus and the stapes. These three bones in the ossicular chain act as a set of levers to amplify the tiny vibrations received by the tympanic membrane. The stapes vibrates in turn causing fluid in a spiral structure known as the cochlea 30 to move along its length. Very small hairlike cells (not shown) in the cochlea are stimulated by the movement of fluid in the cochlea. There, hydraulic pressure displaces the inner ear fluid and mechanical energy in the hair cells is transformed into electrical impulses which are transmitted to neural pathways and the hearing center of the brain (temporal lobe), resulting in the perception of sound.

As shown in FIG. 1, a totally concealed or completely-in-canal hearing device, generally referred to by number 32, is positioned in the auditory canal 20. The electronic components are encased and hermetically sealed in a plastic ear canal mold for protection against corrosion from body fluids and for ease of insertion into the outer ear canal 20. As is shown, the device is located in the canal adjacent to the tympanic membrane and rests substantially entirely on the bony portion 40 of the auditory canal. Specifically the device does not rest on the cartilaginous portion 42 of the auditory canal. Thus, this procedure is a practical result of the discovery that when a portion of an acoustic device is positioned on the auditory canal above the cartilage, the device is subject to vibrations that can cause the device to shift further away from the tympanic membrane which results in the attenuation of high frequency sounds reaching the membrane.

There will now be described a method of preparing an ear canal impression for use in forming an ear canal mold for a completely-in-canal hearing device so that the ear canal mold encasing the hearing aid device when fitted rests substantially entirely on that portion of the auditory ear canal that is supported by bone.

Figure 2:
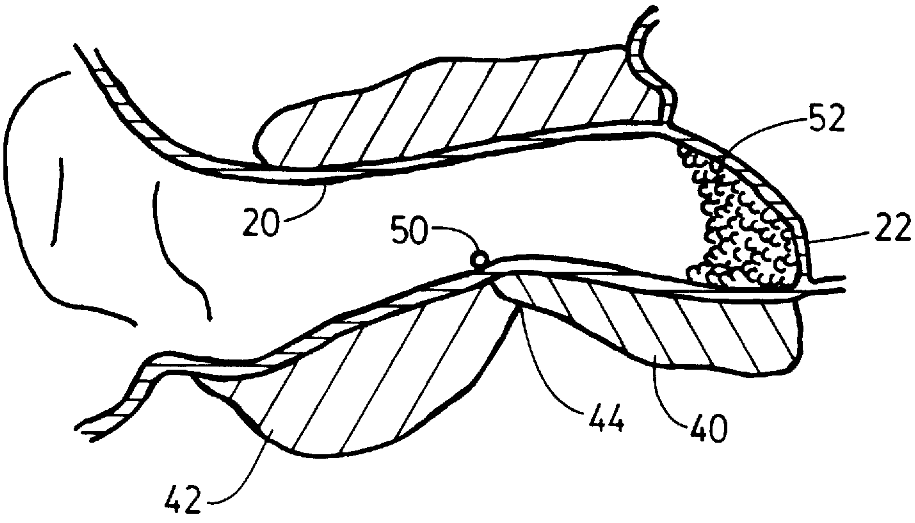
FIGS. 2 and 3 show the process of fabrication of an ear canal impression in the auditory canal.
Figure 3:
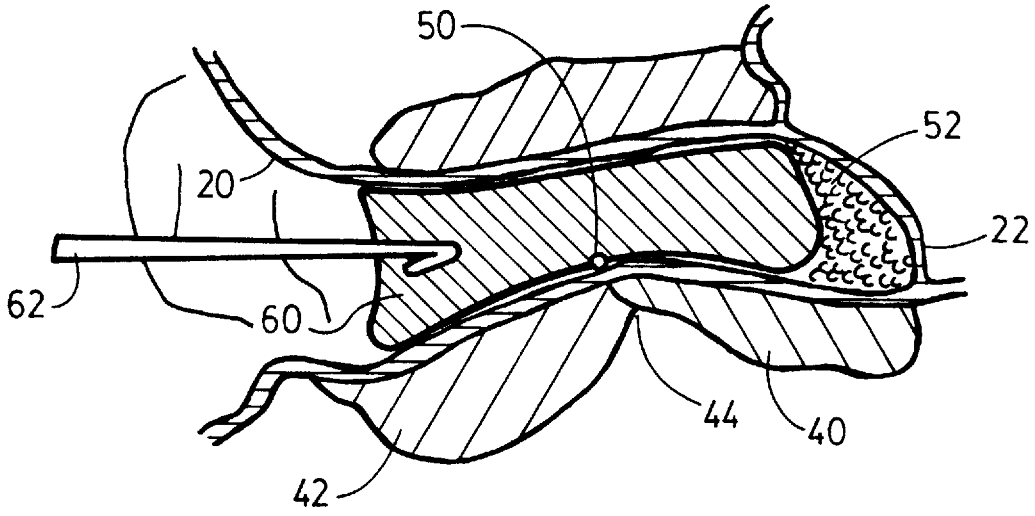

Referring to FIGS. 2 and 3, in preparing the ear canal impression, the ear canal is first inspected by a physician with a stereo operating microscope. Any wax present is removed from the ear canal. Using a metal applicator with cotton whisk, a light covering of mineral oil is applied to the auditory canal. Thereafter, one or more pieces of a suitable covering material 52, for example, a polymer material, that has been cut to approximate the shape of the tympanic membrane, are moistened with water and placed on the exterior surface of the tympanic membrane. The covering material prevents liquid canal impression material from flowing into the inner ear. The patient is asked to open his mouth (not shown) and the junction 44 between the bony 40 and cartilaginous 42 portions of the external auditory canal is identified by observing which portion of the anterior wall moves and which does not during this maneuver. A small length (4 mm.) of string 50 is placed vertically at that point. Typically, about one-third of the outer portion of the auditory canal is cartilaginous. The remaining two-thirds is bony.

The auditory ear canal is then filled with liquid canal impression material 60 such as silicones through a mixing tip to which a blunted 20 gauge needle is attached. The canal impression material is delivered in such a manner that it contacts the covering material 52 and fills the auditory canal from medial to lateral. As it passes the bony cartilaginous junction the string becomes imbedded in the canal impression material. The filling continues to the point that the physician feels will be cosmetically acceptable. A small plastic extraction stick 62 with a medial end that will readily capture in the canal impression material is immediately inserted into the still liquid canal impression material.

After setting for about five (5) minutes, the canal impression is elevated away from the lateral canal skin throughout its circumference using a metal elevator. The extraction stick is then grasped with the fingers and with a slight rotating action the canal impression is slowly withdrawn. Therefore, using an appropriate marking pen the desired position of the receiver port is marked on the canal impression. The port should be directed into the tympanic membrane and generally be near the center of the canal impression.

After the canal impression is made, it is used to fabricate a molding of the eventual ear canal mold to match the user's right and/or left auditory canal as the case may be. Methods of fabricating ear canal molds are known in art and are described, for example, in U.S. Pat. No. 4,834,927. Preferably the plastic casing material for the ear canal mold allows the device to move readily into and out of the canal.

The ear canal mold which has a hollow shell is then assembled with predetermined electronic components. The electronic components include, but are not limited to, a microphone, amplifier, receiver and battery source. It is understood that electronic components employed for the present hearing system are conventional equipment as used in audio devices and hearing aids in particular. Suitable electronic components are described, for example, in U.S. Pat. Nos. 5,033,090, 5,003,608, 4,962,537, 4,937,876, 4,890,330, 4,556,122, 4,471,490 and 3,865,998.

The ear canal mold encasing the acoustic electronic components is made so that the length of the ear canal mold which contacts the auditory canal is about equal to and preferably less than the distance from the string marker to the covering material as shown in FIG. 2. In this fashion, once the acoustic device is properly fitted, it will not shift due to movement of the jaw during talking and chewing. It is this movement that is believed to cause the acoustic device to be uncomfortable and contribute to positive feedback. If the size of the electronic components is such that they cannot be accommodated within the limited shell space, then space lateral to the string marker may be employed. However, as shown in FIG. 1 the ear canal mold lateral to the string marker should be reduced in diameter such that it will not contact the walls of the ear canal. This can be achieved by uniformly removing 1–2 mm of the circumference of the device casing. The device preferably includes a nylon pull-out filament 66 for easy removal.

Although only preferred embodiments of the present invention are specifically disclosed and described above, it will be appreciated that many modifications and variations of the present invention are possible in light of the above teachings and within the purview of the appended claims without departing from the spirit and intended scope of the present invention.

What is claimed is:

1. A method of fabricating an ear canal impression to be used for fabrication of an ear canal mold which does not have a surface that comes into contact with cartilaginous portions of a hearing impaired person's auditory canal which comprises the steps of:

placing a covering on a tympanic membrane of the hearing-impaired person;

identifying a junction between bony and cartilaginous portions of the person's auditory canal;

marking the junction between the bony and cartilaginous portions of the auditory canal;

introducing an ear canal impression material into the auditory canal; and allowing the ear canal impression material to harden to form the ear canal impression whereby the ear canal impression includes an indentation on its surface corresponding to said junction.

2. The method of claim 1 wherein sufficient ear canal impression material is introduced to substantially fill the auditory canal from the tympanic membrane to said junction.

3. The method of claim 1 wherein the step of marking said junction comprises:

causing the person's jaw to move and identifying a position on the auditory canal which does move when the jaw is caused to move.

4. A method of fabricating an ear canal mold for a hearing aid device which comprises the steps of:

placing a covering on the tympanic membrane of a hearing-impaired person;

identifying a junction between bony and cartilaginous portions of the person's auditory canal;

marking the junction between the bony and cartilaginous portions of the person's auditory canal;

introducing an ear canal impression material into the auditory canal;

allowing the ear canal impression material to harden to form an ear canal impression whereby the ear canal impression includes an indentation on its surface corresponding to said junction; and forming an ear canal mold from said ear canal impression wherein the ear canal mold does not have a surface that comes into contact with the cartilaginous portions of the auditory canal.

5. The method of claim 4 wherein sufficient ear canal impression material is introduced to substantially fill the auditory canal from the tympanic membrane to said junction.

6. The method of claim 4 wherein the step of marking said junction comprises:

causing the person's jaw to move and identifying a position on the auditory canal which does move when the jaw is caused to move.

* * * * *